(12) United States Patent
Tragatschnig

(10) Patent No.: US 10,037,051 B2
(45) Date of Patent: Jul. 31, 2018

(54) COMPUTER ARRANGEMENT HAVING A TABLET PART AND A BASE PART

(71) Applicant: Dr. Ing. h.c. F. Porsche Aktiengesellschaft, Stuttgart (DE)

(72) Inventor: Joerg Tragatschnig, Zell am See (AT)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/723,332

(22) Filed: Oct. 3, 2017

(65) Prior Publication Data

US 2018/0101193 A1    Apr. 12, 2018

(30) Foreign Application Priority Data

Oct. 11, 2016    (DE) .................. 10 2016 119 273

(51) Int. Cl.
*G06F 1/16* (2006.01)
*A45C 11/00* (2006.01)
*H04M 1/02* (2006.01)

(52) U.S. Cl.
CPC .............. *G06F 1/162* (2013.01); *G06F 1/166* (2013.01); *G06F 1/1633* (2013.01);
(Continued)

(58) Field of Classification Search
CPC .... G06F 1/1633; G06F 1/1681; G06F 1/1684; G06F 1/1613; G06F 1/162; G06F 1/1643;
(Continued)

(56) References Cited

U.S. PATENT DOCUMENTS 6,317,315 B1    11/2001   Lee et al.
7,599,178 B2 *  10/2009   Huang ............... G06F 1/1632
                                                    361/679.28
(Continued)

FOREIGN PATENT DOCUMENTS

EP      2 378 387       10/2011
WO      2007/144710     12/2007

OTHER PUBLICATIONS

European Search Report dated Feb. 15, 2018.
German Search Report dated Jun. 27, 2017.

*Primary Examiner* — Jinhee Lee
*Assistant Examiner* — Ingrid Wright
(74) *Attorney, Agent, or Firm* — Gerald E. Hespos; Michael J. Porco; Matthew T. Hespos

(57) ABSTRACT

A computer has a tablet (4) and a base (6) detachably connected by hinge (14). Receptacles (20) and plugs (22) form electrical and mechanical connections when the tablet (4) and base (6) are coupled. The base (6) is connected via the hinge (14) to a pivoting rail (12) that has plugs (18) and a first contact (26) on a longitudinal side (17) directed toward the tablet (4). The tablet (4) has receptacles (20) and a second contact (28) on a longitudinal side (23) directed toward the pivoting rail (6). The hinge (46) has toothing system pairs (30), a setting device (32) assigned to a toothing system pair (30) and friction hinge elements (38, 40). Each toothing system pair (30) has two toothing system elements (34, 36) arranged symmetrically to a transverse axis (33) and engaging one another. Each friction hinge (32) is assigned at least one toothing system pair (30).

11 Claims, 3 Drawing Sheets

(52) U.S. Cl.
CPC .......... *G06F 1/1643* (2013.01); *G06F 1/1681* (2013.01); *A45C 2011/003* (2013.01); *G06F 2200/1634* (2013.01); *H04M 1/0216* (2013.01)

(58) Field of Classification Search
CPC ..... G06F 1/166; G06F 1/1634; H05K 5/0226; A45C 2011/003; H04M 1/0216
See application file for complete search history.

(56) References Cited

U.S. PATENT DOCUMENTS

| | | | |
|---|---|---|---|
| 8,238,085 B2 * | 8/2012 | Wu | G06F 1/1616 |
| | | | 312/223.1 |
| 2003/0112590 A1 | 6/2003 | Shimano et al. | |
| 2005/0122671 A1 * | 6/2005 | Homer | G06F 1/1618 |
| | | | 361/679.27 |
| 2012/0106078 A1 | 5/2012 | Probst et al. | |
| 2013/0036846 A1 | 2/2013 | Griffin et al. | |
| 2014/0126126 A1 * | 5/2014 | Chuang | G06F 1/1626 |
| | | | 361/679.01 |
| 2016/0041589 A1 | 2/2016 | Tazbaz | |

\* cited by examiner

COMPUTER ARRANGEMENT HAVING A TABLET PART AND A BASE PART

CROSS REFERENCE TO RELATED APPLICATION

This application claims priority under 35 USC 119 to German Patent Appl. No. 10 2016 119 273.2 filed on Oct. 11, 2016, the entire disclosure of which is incorporated herein by reference.

BACKGROUND

Field of the Invention

The invention relates to a computer arrangement having a tablet part and a base part that can be connected detachably to one another. A hinge arrangement and a securing device are provided and can be secured in position with respect to one another by a setting device. At least one pair of electrical contacts, composed of a first and a second contact element, and at least one plug-type connection composed of a plug component and a receptacle opening, are provided. The electrical contacts and the plug-type connection form both an electrical and a mechanical connection when the tablet part is coupled to the base part.

Description of the Related Art

Tablet computers have become widespread. Tablet computers employ a simple intuitive handling in which input commands are made via a touchscreen so that the tablet computer is easy to use. However, for particular uses, such as for text programs, it has proven helpful to assign external keyboards to the tablet. It also has become known to provide a tablet-laptop combination with a tablet part and a base part that can be connected detachably to one another. The Surface Book by Microsoft is an example of a tablet-laptop combination. US 2016/0041589 discloses a hinge arrangement for connecting the tablet part to the base part. The advantage of such a computer arrangement is that the tablet part can be used independently as a simple input-playback unit and the tablet part and the base part can be used together as a high-performance laptop for professional work. A disadvantage of this known computer arrangement, however, is the complex hinge that does not permit complete rotation, i.e. rotation through 360°, of the tablet with respect to the base part.

The object of the invention is therefore to avoid these disadvantages in the most simple and cost-effective way possible.

SUMMARY

The invention relates to a tablet-laptop combination where the base part is connected via the hinge arrangement to a pivoting rail that has at least two plug components and at least a first contact element on a longitudinal side directed toward the tablet part. The tablet part has at least two receptacle openings and at least a second contact element on a longitudinal side directed toward the pivoting rail. The hinge arrangement has two toothing system pairs and at least one setting device that is assigned to a toothing system pair and may be a friction hinge arrangement with two friction elements. The toothing system pairs each form two toothing system elements that are symmetrical with respect to a transverse axis and engage one in the other. Each friction hinge arrangement is assigned to at least one toothing system pair.

The pivoting rail that is connected via the hinge arrangement to the base part ensures rotation with up to 360° by means of simple toothing system elements. As a result, the tablet part can be used even when the tablet is coupled to the base part. Thus, the base part serves as a support.

The toothing system elements of a toothing system pair may be fixed toothing system elements with longitudinal toothing.

The securing device may have a displaceable closing pin in the region of the plug-type connection. The displaceable closing pin that is in the coupled state interacts with the respective plug component. The closing pin can be provided both as part of the plug component and in the region of the receptacle opening. To activate the securing device in a simple way, the securing device can have a drive means such as e.g. an electric motor or a solenoid. This drive means then actuates the closing pins. However, it is also conceivable for the closing pins to be arranged under prestress in such a way that manual activation has to be made to release the tablet part from the base part.

The friction element has two friction cylinders that may be connected fixedly to one another. A pin element of the base part may engage in the first friction cylinder, and a pin element of the pivoting rail may engage in the second friction cylinder. The respective toothing system elements and friction cylinders may have the same rotational axes. As a result, in the state in which the tablet part is connected to the base part the tablet part can be secured in an easy way in any position with respect to the base part.

The electrical contact pair may comprise a connector connection to a connector element as a first contact element and a socket element as a second contact element. In this context, the plug component and the connector element may be on the pivoting rail. Additionally, the receptacle opening and the socket element may be on the tablet part. In this context, a central connector connection may be provided.

The at least one electrical contact pair and the at least two plug-type connections are embodied symmetrically with respect to the common transverse axis of the tablet part and of the base part. As a result, it is possible in a particularly easy way for the tablet part to be arranged with a display side directed toward a keyboard of the base part or facing away therefrom, without double assignment of the at least one contact pair being necessary. The tablet part can in this way close off the keyboard and at the same time be used as an input-playback unit. For this purpose, double assignment of the electrical contact pairs is possibly necessary.

In order to ensure a high level of performance, a processor can be provided both in the tablet part and the base part.

In one particularly advantageous embodiment, at least the tablet part has a housing composed of a ferromagnetic material such that accessory components such as e.g. an input pin can be assigned on the tablet part by means of a magnetic connection.

The invention will be explained in more detail with reference to a drawing.

DETAILED DESCRIPTION

Figure 1:
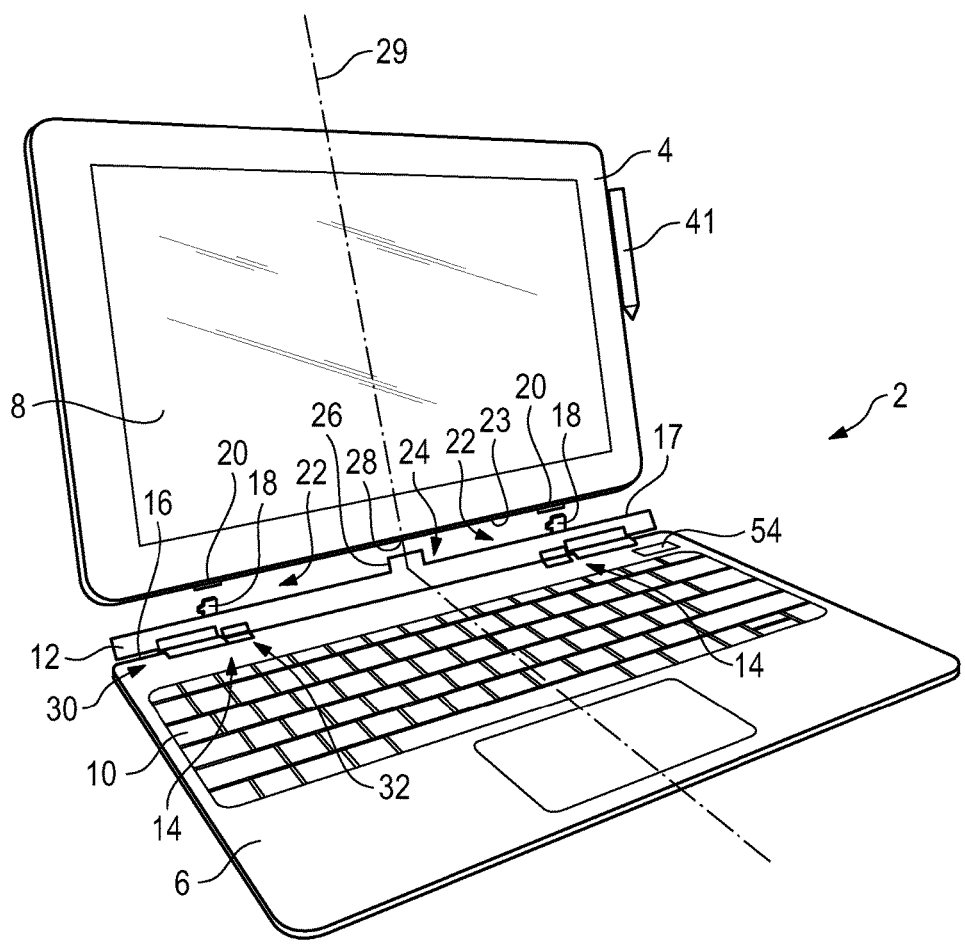
FIG. 1 shows a perspective view of a computer arrangement according to the invention in the uncoupled state.
Figure 2:
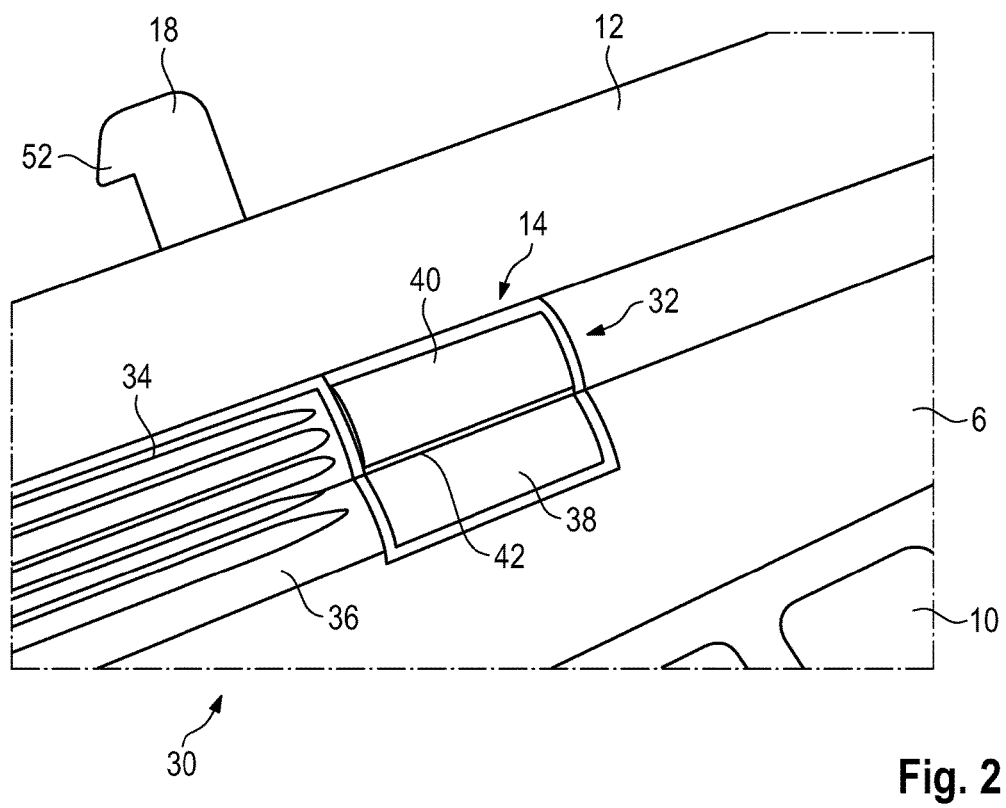
FIG. 2 shows a view of a detail of an uncoupled hinge arrangement from FIG. 1.

FIGS. 1 and 2 show a computer arrangement 2 according to the invention in perspective views, wherein in the illustrated state a tablet part 4 is uncoupled from a base part 6. The tablet part 4 can serve in a known fashion as a "stand-alone" input and playback part. In this context, a touch-sensitive display 8 is essentially used. The tablet part 4 has its own power supply and its own processor.

The base part 6, also referred to as a docking part, also has its own power supply and its own processor. Furthermore, the base part 6 has an input keyboard 10. Furthermore, in this view a pivoting rail 12 for coupling the base part 6 to the tablet part 4 is provided, which pivoting rail 12 is connected to a longitudinal side 16 of the base part 6 via a hinge arrangement 14.

The pivoting rail 12 has, on its longitudinal side 17 directed toward the tablet part, two plug components 18 which, together with in each case one receptacle opening 20, illustrated in a concealed fashion, in the tablet part 4, form a plug-type connection 22 and in this way connect the pivoting rail 12 and therefore the base part 6 to a longitudinal side 23 of the tablet part 4. Furthermore, an electrical contact pair 24 is provided which has a first and a second contact element 26, 28. The first contact element 26 is embodied here as a connector element which can engage in a corresponding socket element as a second contact element 28 in the tablet part 4. The electrical contact pair 24 is arranged symmetrically with respect to a common transverse axis 29 of the tablet part 4 and of the base part 6.

The hinge arrangement 14 is formed by two toothing system pairs 30 and two setting devices 32, wherein the setting devices 32 are embodied as friction hinge arrangements. In this context, each toothing system element 34, 36 is assigned a friction element 38, 40 of the friction hinge arrangement 32 (see in this respect FIG. 2). The toothing system pairs 30 and the setting devices 32 are arranged symmetrically with respect to a transverse axis 33 here.

In the present exemplary embodiment, both the tablet part 4 and the base part 6 have a housing made of a ferromagnetic material, with the result that an at least partially magnetically embodied input pin 41 can be easily arranged on the tablet part 4.

FIG. 2 then shows a perspective view of a detail of the particularly advantageous embodiment according to FIG. 1. A toothing system pair 30 with the assigned friction hinge arrangement 32 and the respective toothing system elements 34, 36 and friction elements 38, 40 can be clearly seen. Friction elements 38, 40 each have a friction cylinder 39 and are fixedly connected to one another by means of a web element 42 here. Furthermore, the pivoting rail 12 is connected to a plug component 18. The toothing system elements 34, 36 are preferably embodied as two fixed toothing system elements 34, 36 with longitudinal toothing. The plug component 18 is embodied in a square shape here and fits precisely into the receptacle opening 20 on the tablet part 4. The plug component 18 is rotatably mounted by means of the pivoting rail 12.

Figure 3:
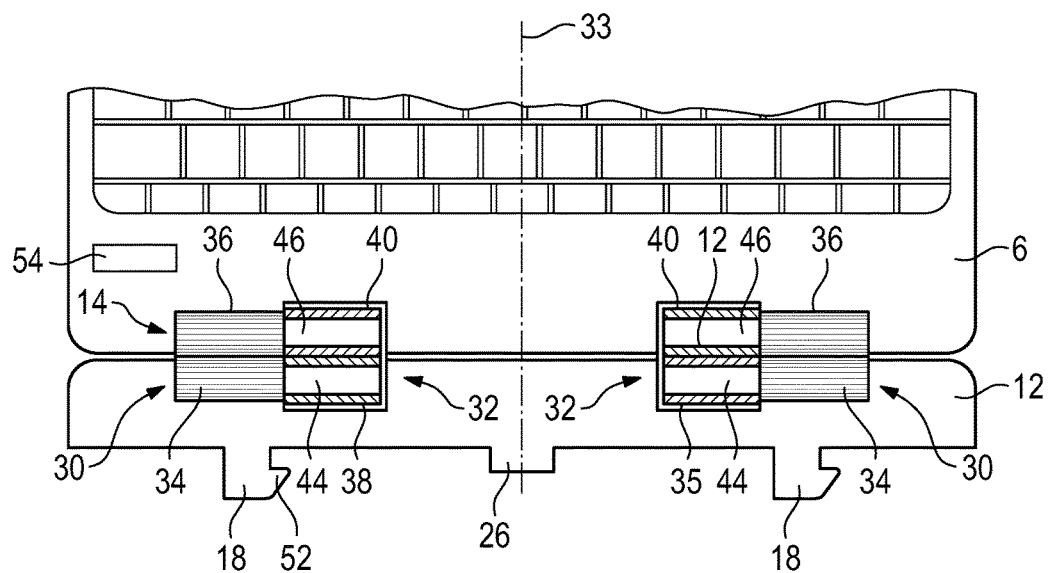
FIG. 3 shows a partially sectional partial view of a base part of the computer arrangement from FIG. 1.

The entire pivoting rail 12 and, in particular, an embodiment of the friction hinge arrangements 32 are illustrated in FIG. 3. In this context, the toothing system elements 34, 36 each have a pin element 44, 46 which engages in the friction cylinder 39 of the respective friction element 38, 40, and said toothing system elements 34, 36 therefore form a setting device 32 which permits the tablet part 4 to be set, in the coupled state, in a position desired by the user. For this purpose, the friction hinge arrangement 32 can be rotated with respect to the pivoting rail 12 and the base part 6. Such a hinge arrangement has the advantage that adjustable rotation of the tablet part 4 with respect to the base part 6 through 360° is possible.

Figure 4:
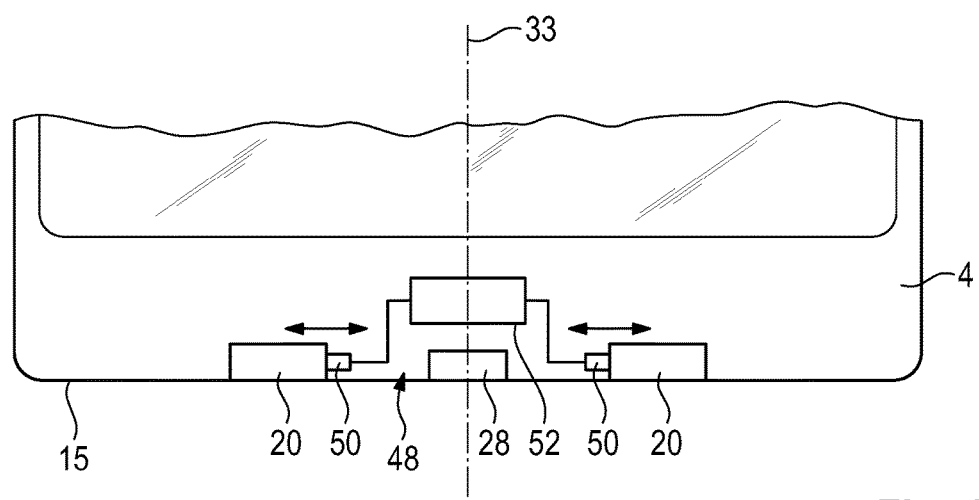
FIG. 4 shows a partially sectional partial view of a tablet part of the computer arrangement from FIG. 1.

In the present exemplary embodiment, a securing device 48 (not shown in more detail in FIG. 4) is integrated into the base part 6. The securing device 48 (not illustrated here further) drives a closing pin 50 which is integrated in the plug component 18 and engages in a known fashion behind a projection 52 of the plug component 18 in the coupled state. For this purpose, the plug components 18 are then introduced into the receptacle openings 20 in the tablet part 4. The second contact element 28 is embodied here as a socket element for the connector element 26.

As illustrated schematically, in the present exemplary embodiment the securing device 48 has a drive means 52 which is embodied as a solenoid. The securing device 48 can easily be operated by means of a triggering knob 54 illustrated in FIG. 1. Of course, further drive means, such as for example an electric motor, are also conceivable. It is also possible to use a manually operated spring-loaded securing device.

In the exemplary embodiments shown, in each case it has been assumed that there is one electrical contact pair 24 and two plug-type connections 22. However, it is also possible to provide, for example, two electrical contact pairs 24.

What is claimed is:

1. A computer arrangement comprising a tablet part and a base part which can be detachably connected to one another, wherein a hinge arrangement and a securing device are provided and can be secured in position with respect to one another by means of a setting device, wherein at least one pair of electrical contacts, composed of a first and a second contact element, and at least one plug-type connection composed of a plug component and a receptacle opening, are provided, and in the state in which the tablet part is coupled to the base part they form both an electrical and a mechanical connection, wherein the base part is connected via the hinge arrangement to a pivoting rail that has at least two plug components and at least a first contact element on a longitudinal side directed toward the tablet part, and the tablet part has at least two receptacle openings and at least a second contact element on a longitudinal side directed toward the pivoting rail, wherein the hinge arrangement has two toothing system pairs and at least one setting device that is assigned to one of the toothing system pairs, and the at least one setting device comprises a friction hinge with two friction elements, each of the toothing system pairs has two toothing system elements that are arranged symmetrically with respect to a transverse axis and the toothing system elements in each of the toothing system pairs engage one in the other, wherein the friction elements of the at least one friction hinge are assigned to the toothing system elements of at least one of the toothing system pairs.

2. The computer arrangement of claim 1, characterized in that the toothing system elements of a toothing system pair are embodied as fixed toothing system elements with longitudinal toothing.

3. The computer arrangement of claim 1, characterized in that the securing device has, in the region of the plug-type connection, a displaceable closing pin which, in the coupled state, interacts with the respective plug component.

4. The computer arrangement of claim 3, wherein the securing device has an electric motor or a solenoid.

5. The computer of claim 4, wherein the friction element has in each case a friction cylinder, wherein a pin element of the toothing system element of the pivoting rail engages in the first friction cylinder of the first friction element, and a pin element of the second toothing system element of the base part engages in the friction cylinder, wherein the friction elements are fixedly connected to one another by means of a web element.

6. The computer arrangement of claim 1, wherein the electrical contact pair is a connector connected into to a connector element as a first contact element and a socket element as a second contact element.

7. The computer arrangement of claim 6, wherein the plug component and the connector element are provided on the pivoting rail, and the receptacle opening and the socket element are provided on the tablet part.

8. The computer arrangement of claim 7, wherein a central connector connection is provided.

9. The computer arrangement of claim 7 wherein the at least one electrical contact pair and the at least two plug-type connections are embodied symmetrically with respect to the common transverse axis of the tablet part and of the base part.

10. The computer arrangement of claim 9, wherein a processor is provided both in the tablet part and in the base part.

11. The computer arrangement of claim 10, characterized in that at least the tablet part has a housing composed of a ferromagnetic material such that accessory components such as e.g. an input pin can be arranged on the tablet part by means of a magnetic connection.

* * * * *